US012743812B2

(12) United States Patent
Therkelsen et al.

(10) Patent No.: US 12,743,812 B2
(45) Date of Patent: Sep. 22, 2026

(54) METHOD FOR REJECTING HEAD DETECTIONS THROUGH WINDOWS IN MEETING ROOMS

(71) Applicant: Cisco Technology, Inc., San Jose, CA (US)

(72) Inventors: Bjørn Are Therkelsen, Oslo (NO); Asbjorn Therkelsen, Ebru (NO); Rune Øistein Aas, Lysaker (NO)

(73) Assignee: CISCO TECHNOLOGY, INC., San Jose, CA (US)

(*) Notice: Subject to any disclaimer, the term of this patent is extended or adjusted under 35 U.S.C. 154(b) by 580 days.

(21) Appl. No.: 18/174,321

(22) Filed: Feb. 24, 2023

(65) Prior Publication Data

US 2024/0289984 A1 Aug. 29, 2024

(51) Int. Cl.
*G06T 7/73* (2017.01)
*G06T 7/60* (2017.01)
(Continued)

(52) U.S. Cl.
CPC .................. *G06T 7/74* (2017.01); *G06T 7/60* (2013.01); *G06V 20/40* (2022.01); *G06V 40/161* (2022.01);
(Continued)

(58) Field of Classification Search
CPC ...... H04N 23/64; H04N 23/667; H04N 23/90; H04N 23/695; H04N 7/15; H04R 1/406; H04R 3/005; H04R 27/00; H04R 2201/025; H04R 2201/40; G10L 15/26; G10L 21/0208
See application file for complete search history.

(56) References Cited

U.S. PATENT DOCUMENTS 8,218,831 B2 7/2012 Tian et al.
9,633,270 B1 4/2017 Tangeland et al.
(Continued)

FOREIGN PATENT DOCUMENTS

JP 2017108240 A * 6/2017
WO 2011081527 A1 7/2011

OTHER PUBLICATIONS

Dao, A.D., “Defining Your Meeting Space,” Neat, Retrieved from https://neat.no/stories/defining-your-meeting-space/, Sep. 13, 2021, 4 Pages.

(Continued)

*Primary Examiner* — Amandeep Saini
(74) *Attorney, Agent, or Firm* — Edell, Shapiro & Finnan, LLC

(57) ABSTRACT

A method is performed by an endpoint device that includes a microphone array to detect audio and a camera to capture video. The method comprises: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

20 Claims, 16 Drawing Sheets

(51) Int. Cl.
*G06V 20/40* (2022.01)
*G06V 40/16* (2022.01)

(52) U.S. Cl.
CPC ............................... *G06T 2200/24* (2013.01); *G06T 2207/10016* (2013.01); *G06T 2207/20081* (2013.01); *G06T 2207/20092* (2013.01); *G06T 2207/30201* (2013.01)

(56) References Cited

U.S. PATENT DOCUMENTS

| | | | | |
|---|---|---|---|---|
| 9,686,605 | B2 | 6/2017 | Sun | |
| 9,712,783 | B2 | 7/2017 | Aarrestad et al. | |
| 11,115,625 | B1 | 9/2021 | Stuan et al. | |
| 11,128,793 | B2 | 9/2021 | Therkelsen et al. | |
| 2006/0170791 | A1* | 8/2006 | Porter | H04N 23/675 348/E5.042 |
| 2014/0104374 | A1 | 4/2014 | Buckler | |
| 2015/0015708 | A1 | 1/2015 | Collett et al. | |
| 2017/0099462 | A1* | 4/2017 | Tangeland | H04N 7/147 |
| 2019/0199967 | A1 | 6/2019 | Tangeland et al. | |
| 2020/0293752 | A1* | 9/2020 | Lin | H04N 23/611 |
| 2022/0053037 | A1* | 2/2022 | Tjøntveit | H04L 12/1813 |

OTHER PUBLICATIONS

Neti, et al., "Editorial," EURASIP Journal on Applied Signal Processing 2002:11, Nov. 2022, pp. 1151-1153.

Zotkin, et al., "Joint Audio-Visual Tracking Using Particle Filters," EURASIP Journal on Applied Signal Processing 2002:11, Nov. 2022, pp. 1154-1164.

Sodoyer, et al., "Separation of Audio-Visual Speech Sources: A New Approach Exploiting the Audio-Visual Coherence of Speech Stimuli," EURASIP Journal on Applied Signal Processing 2002:11, Nov. 2022, pp. 1165-1173.

Jiang, et al., "On the Relationship between Face Movements, Tongue Movements, and Speech Acoustics," EURASIP Journal on Applied Signal Processing 2002:11, Nov. 2022, pp. 1174-1188.

Patterson, et al., "Moving-Talker, Speaker-Independent Feature Study, and Baseline Results Using the CUAVE Multimodal Speech Corpus," EURASIP Journal on Applied Signal Processing 2002:11, Nov. 2022, pp. 1189-1201.

Daubias, et al., "Statistical Lip-Appearance Models Trained Automatically Using Audio Information," EURASIP Journal on Applied Signal Processing 2002:11, Nov. 2022, pp. 1202-1212.

Aleksic, et al., "Audio-Visual Speech Recognition Using MPEG-4 Compliant Visual Features," EURASIP Journal on Applied Signal Processing 2002:11, Nov. 2022, pp. 1213-1227.

Zhang, et al., "Automatic Speechreading with Applications to Human-Computer Interfaces," EURASIP Journal on Applied Signal Processing 2002:11, Nov. 2022, pp. 1228-1247.

Gordan, et al., "A Support Vector Machine-Based Dynamic Network for Visual Speech Recognition Applications," EURASIP Journal on Applied Signal Processing 2002:11, Nov. 2022, pp. 1248-1259.

Heckmann, et al., "Noise Adaptive Stream Weighting in Audio-Visual Speech Recognition," EURASIP Journal on Applied Signal Processing 2002:11, Nov. 2022, pp. 1260-1273.

Nefian, et al., "Dynamic Bayesian Networks for Audio-Visual Speech Recognition," EURASIP Journal on Applied Signal Processing 2002:11, Nov. 2022, pp. 1274-1288.

* cited by examiner

METHOD FOR REJECTING HEAD DETECTIONS THROUGH WINDOWS IN MEETING ROOMS

TECHNICAL FIELD

The present disclosure relates to video and audio processing techniques employed to improve a video conference experience.

BACKGROUND

A meeting room used for a video conference may have a large glass window facing a corridor or an indoor open space. During a video conference, a video conference system employs automatic head detection to detect heads or faces of individuals, and employs automatic video framing that includes the detected heads in a video layout for transmission to far-end video conference systems via a video stream. Sometimes individuals who are not part of the video conference may be positioned behind the glass window. The head detection detects the heads of such individuals through the glass window, and the video framing incorrectly includes the detected heads in the video layout for transmission to the far-end even though they should not be included. This causes confusion for participants at the far-end.

DETAILED DESCRIPTION

Overview

In an embodiment, a method is performed by an endpoint device that includes a microphone array to detect audio and a camera to capture video. The method comprises: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

Example Embodiments

Figure 1:
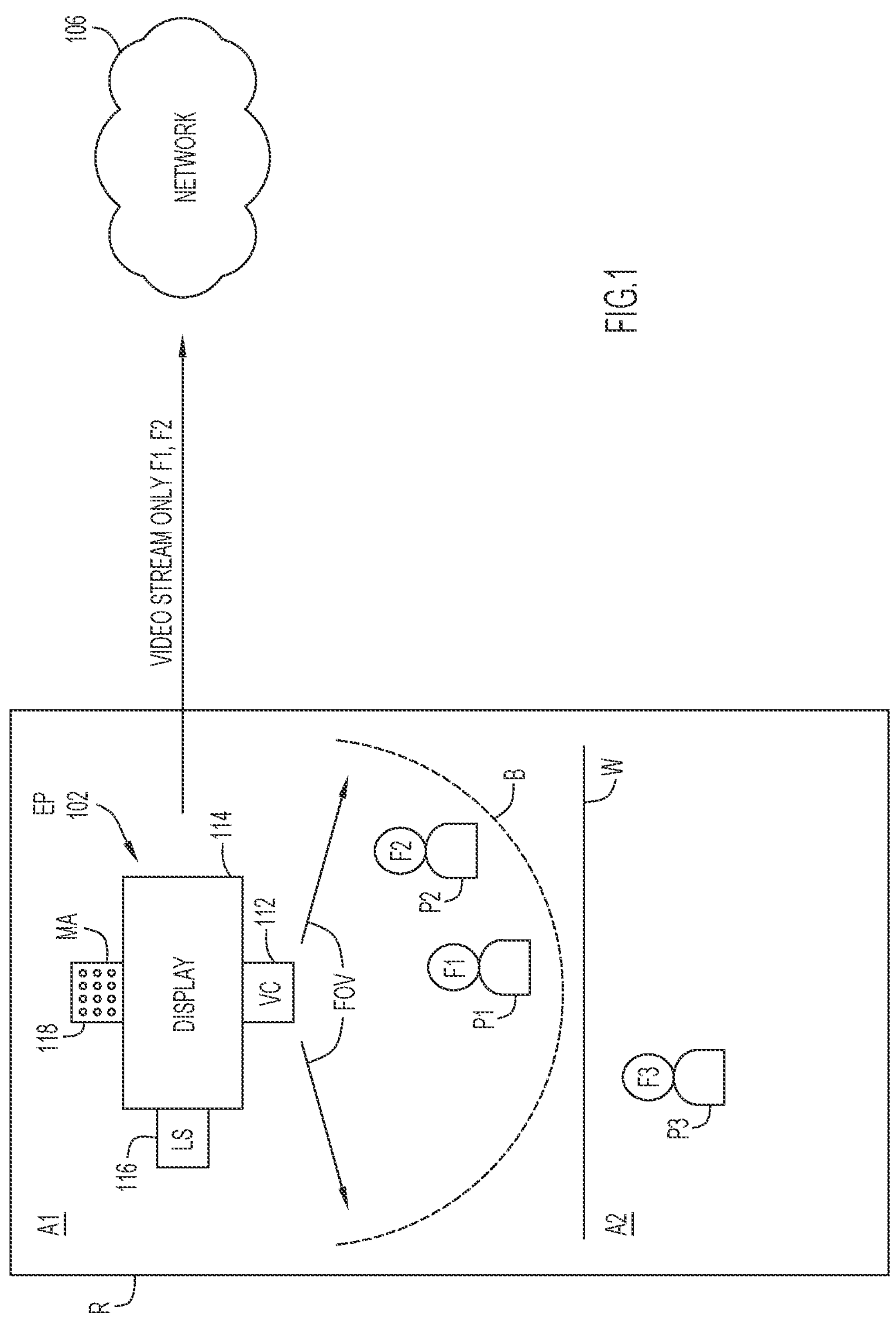
FIG. 1 is an illustration of a video conference system or endpoint (EP) configured to reject faces detected behind glass barriers of a meeting room during a video conference, according to an example embodiment.

With reference to FIG. 1, there is an illustration of an example video conference (e.g., teleconference) system or endpoint (EP) 102 (also referred to as an "endpoint device") in which embodiments directed to rejecting faces detected behind glass barriers during a video conference may be implemented. Endpoint 102 is deployed in a meeting room R divided into a first area A1 and a second area A2 by a visually transparent acoustic barrier W, such as a large glass window or wall. Endpoint 102 is positioned in first region A1 together with individuals P1 and P2, while an individual P3 is positioned behind barrier W with respect to the endpoint. Endpoint 102 may be a wired and/or a wireless communication device, such as, but not limited to a laptop or tablet computer, a smartphone, a dedicated teleconference system, and the like. Endpoint 102 is configured to establish audio-video teleconference collaboration sessions (e.g., video conferences) with far-end or remote endpoints over a network 106.

Endpoint 102 includes a video camera (VC) 112 (e.g., also referred to simply as a camera) to capture video of the meeting room in a field of view (FOV) of the video camera, a display 114, a loudspeaker (LS) 116, and a microphone array (MA) 118 to detect audio. Endpoint 102 implements face detection to detect faces of individuals in video captured by video camera 112, and generates a video layout from the captured video that includes the faces as detected (i.e., detected faces) for transmission to network 106 in a video stream during a video conference. In addition, endpoint 102 implements speaker tracking to detect active talkers (referred to simply as "talkers" or "speakers") based on audio detected by microphone array 118. Endpoint 102 transmits the detected audio to network 106 in an audio stream during the video conference. As used herein, "face detection" is construed to also encompass "head detection." Similarly, "detecting faces" is construed to also encompass "detecting heads." The embodiments presented herein apply equally to detection of faces and heads, and the terms "face" and "head" may be used interchangeably.

According to embodiments presented herein, endpoint 102 detects faces using the face detection, detects talkers using the speaker tracking, and generates boundary data for a boundary B that defines maximum distances (Dmax) for face angles (Ay) (e.g., Dmax vs. Ay) relative to video camera 112 across the FOV, based on positions of the detected faces and positions of the detected talkers. In the example of FIG. 1, the maximum distances and the face angles constrain boundary B to area A1 because endpoint 102 can detect both faces and talkers in that area. On the other hand, boundary B does not extend into area A2 because endpoint 102 can only detect faces in that area due to barrier W. Endpoint 102 may generate the boundary data during a training mode and/or in real-time during a video conference session.

Once the boundary data is created, endpoint 102 uses the boundary data during a video conference to frame video and determine which detected faces to include in the video layout for transmission. Specifically, endpoint 102 includes faces detected within boundary B (e.g., faces F1, F2 of individuals P1, P2 in area A1) in the video layout. On the other hand, endpoint 102 does not include faces detected outside of boundary B (e.g., face F3 of individual P3 in area A2) in the video layout. In other words, endpoint 102 only includes the faces detected within boundary B in the video layout. Endpoint 102 rejects the detected faces that fall behind barrier W (e.g., the glass wall).

Figure 2:
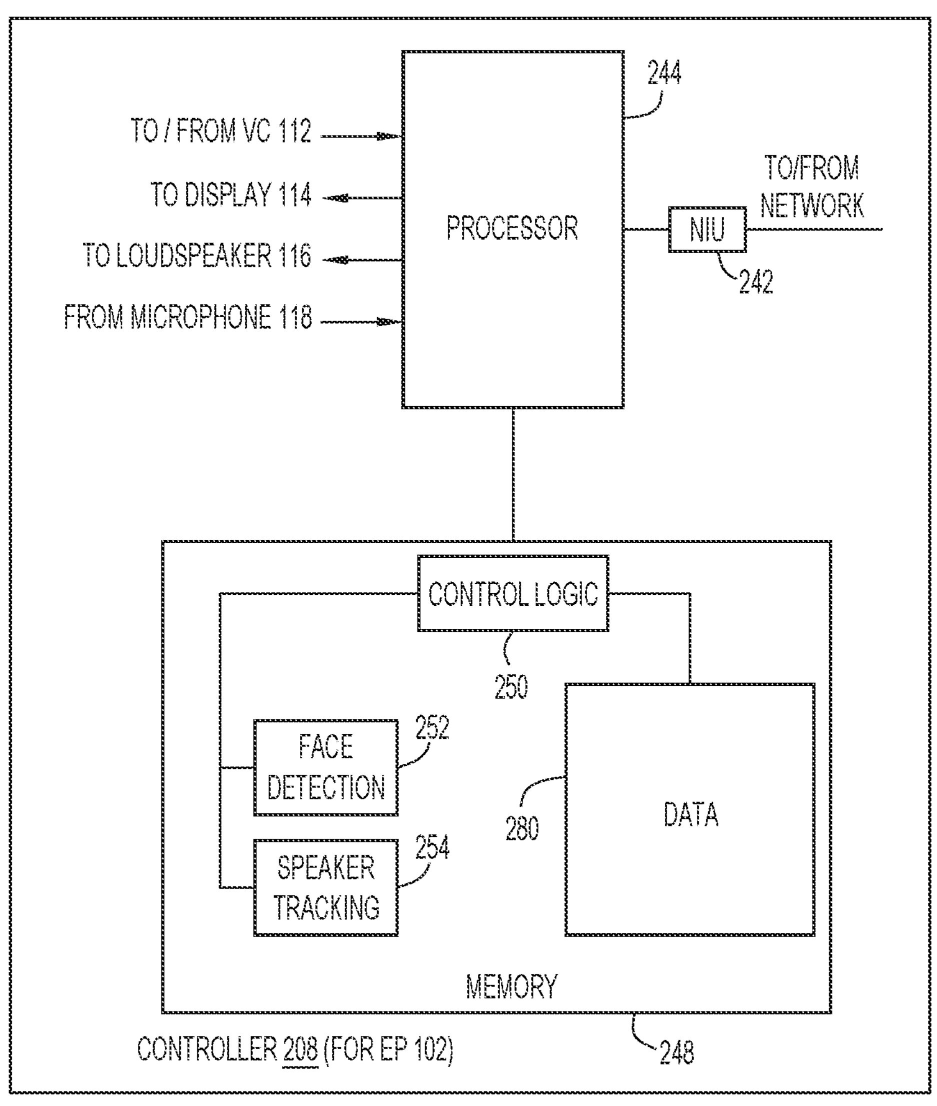
FIG. 2 is a block diagram of a controller of the endpoint according to an example embodiment.

Reference is now made to FIG. 2, which is a block diagram of an example controller 208 of endpoint 102 configured to perform embodiments presented herein. There are numerous possible configurations for controller 208 and FIG. 2 is meant to be an example. Controller 208 provides overall control of endpoint 102. Controller 208 includes a network interface unit 242, a processor 244, and memory 248. The aforementioned components of controller 208 may be implemented in hardware, software, firmware, and/or a combination thereof. The network interface (I/F) unit (NIU) 242 is, for example, an Ethernet card or other interface device that allows the controller 208 to communicate over a communication network (e.g., network 106). Network I/F unit 242 may include wired and/or wireless connection capability.

Processor 244 may include a collection of microcontrollers and/or microprocessors, for example, each configured to execute respective software instructions stored in the memory 248. The collection of microcontrollers may include, for example: a video controller to receive, send, and process video signals related to display 114 and video camera 112; an audio processor to receive, send, and process audio signals related to loudspeaker 116 and microphone array 118; and a high-level controller to provide overall control. Portions of memory 248 (and the instructions therein) may be integrated with processor 244. Processor 244 may send pan, tilt, and zoom commands to video camera 112 to vary the camera FOV.

In the transmit direction, processor 244 processes audio/video captured by microphone array 118/VC 112, encodes the captured audio/video into data packets, and causes the encoded data packets to be transmitted to the communication network. In the receive direction, processor 244 decodes audio/video from data packets received from the communication network and causes the audio/video to be presented via loudspeaker 116/display 114. As used herein, the terms "audio" and "sound" are synonymous and used interchangeably. Also, "voice" and "speech" are synonymous and used interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for control logic 250 perform operations described herein.

Control logic 250 may include face detection logic 252 that employs any known or hereafter developed technique to detect faces and estimate face positions (e.g., distances and angles) of the detected faces relative to video camera 112 based on captured video. Control logic 250 also includes speaker tracking logic 254 that employs any known or hereafter developed technique to detect (active) talkers and estimate positions of the detected talkers based on audio detected by microphone array 118. Such techniques may include machine learning techniques. For example, microphone array 118 detects sound impinging on individual microphones of the microphone array to produce individual microphone signals, and provides the individual microphone signals to controller 208. Speaker tracking logic 254 processes different pairs of the microphone signals to detect the talkers and their positions relative to microphone array 118.

In addition, memory 248 stores data 280 used and generated by control logic 250, including, but not limited to, information associated with detected faces, information associated with detected talkers, boundary data, video layouts, and so on.

Figure 4:
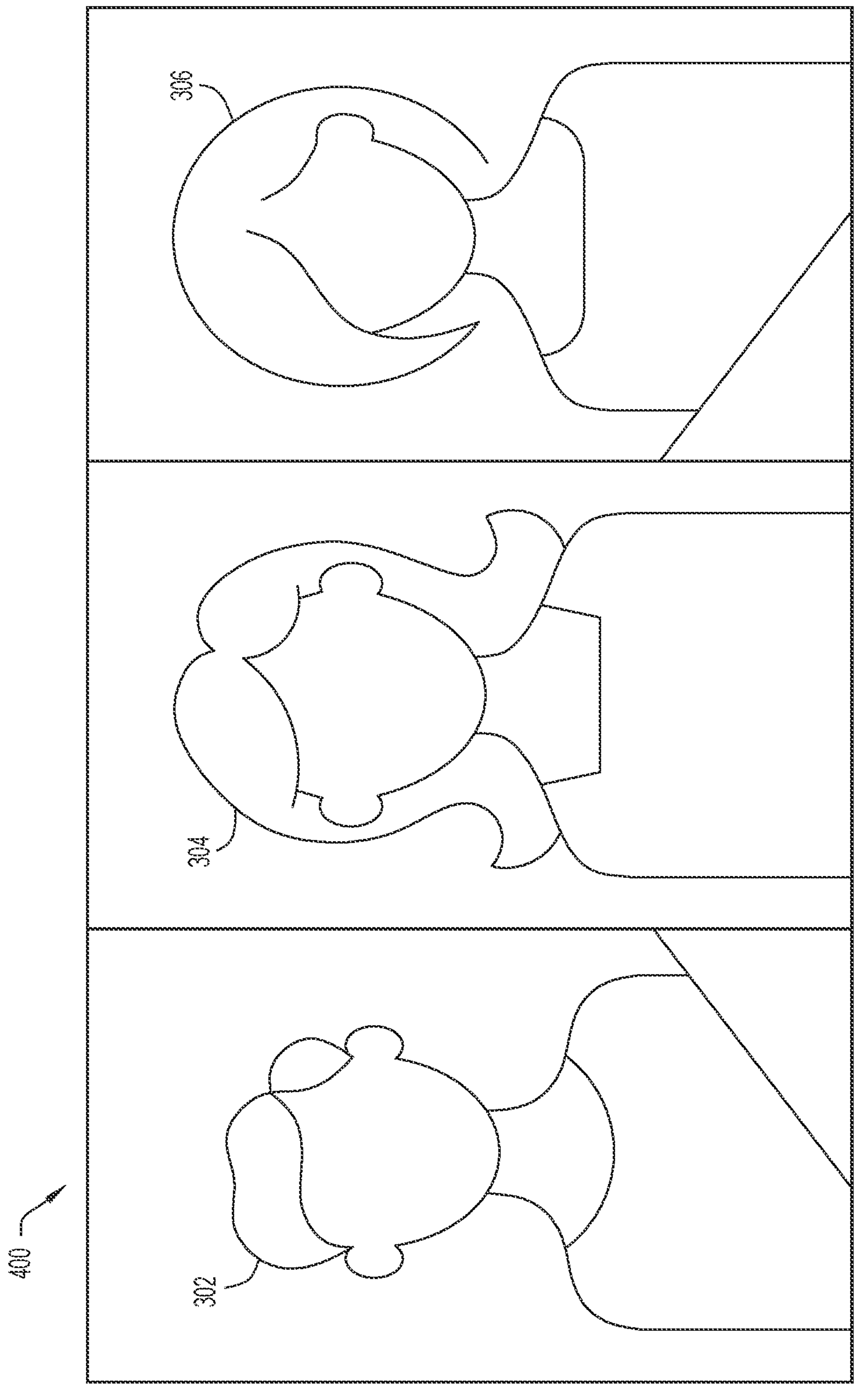
FIG. 4 shows an improved video layout of the meeting room captured in video by the video camera, according to an example embodiment.
Figure 5A:
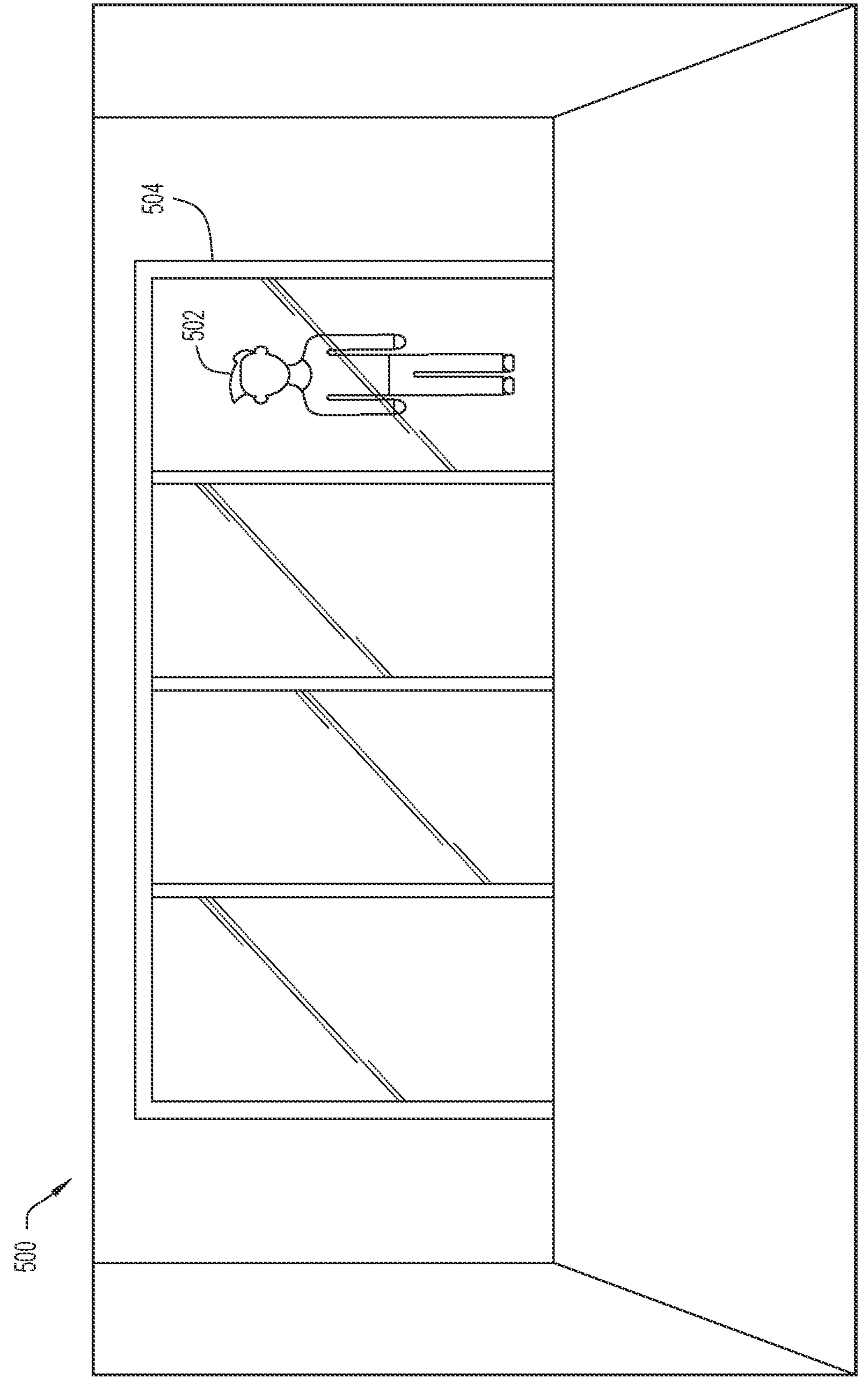
FIG. 5A shows a video layout of the meeting room captured by the video camera from a vantage point that shows an individual standing behind a glass wall positioned between the individual and the video camera, according to an example embodiment.
Figure 5B:
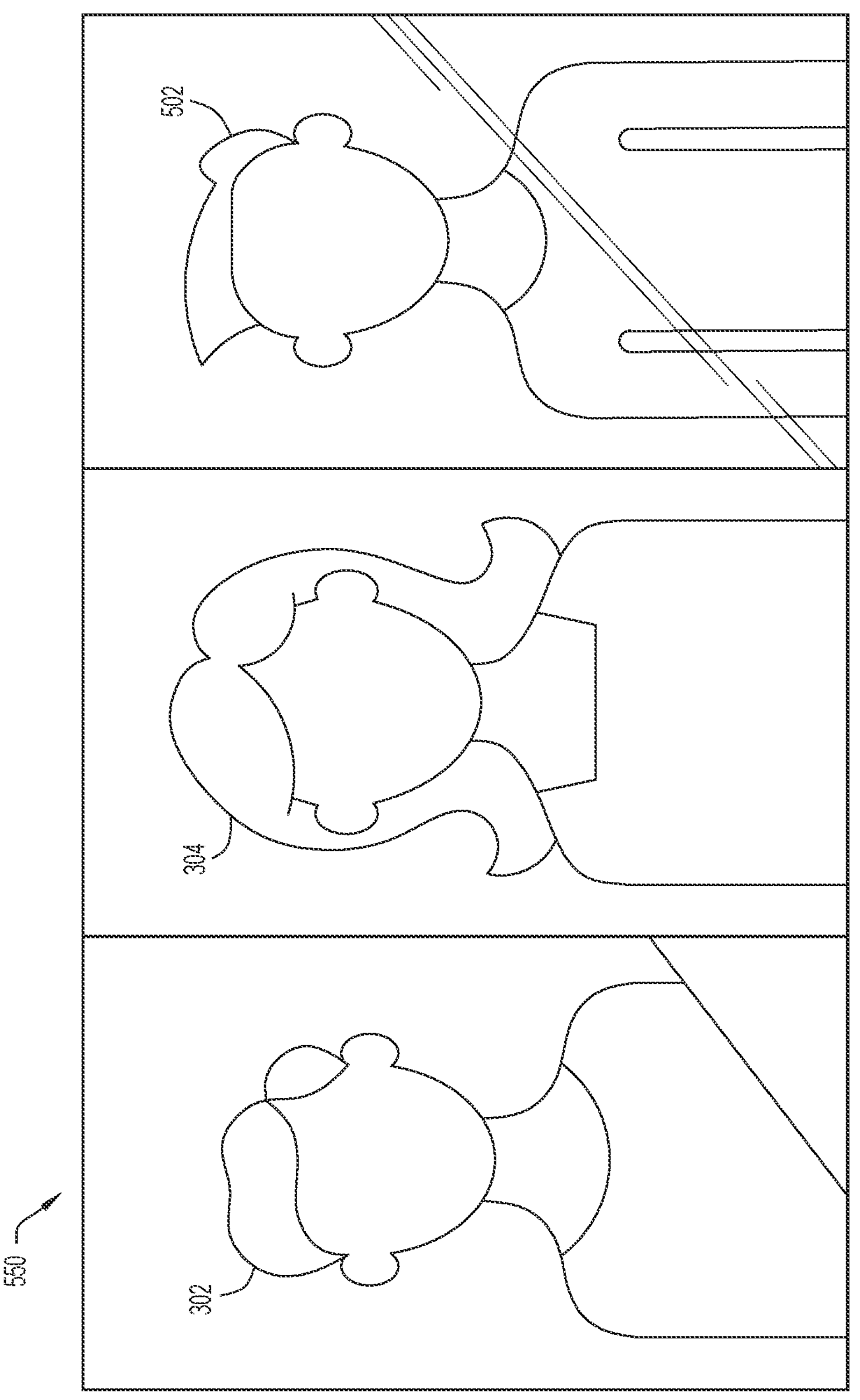
FIG. 5B shows a mosaic video layout that presents individuals who are both in the meeting room and behind the glass wall, according to an example embodiment.

Example video layouts for video of a meeting room and general video processing/analysis techniques associated with the video layouts are described next in connection with FIGS. 3-6, in which FIGS. 5A and 5B provide an illustration of detecting faces of individuals positioned behind a glass wall of the meeting room. Embodiments used to reject faces detected behind the glass wall are then described in connection with FIGS. 7-12.

Figure 3:
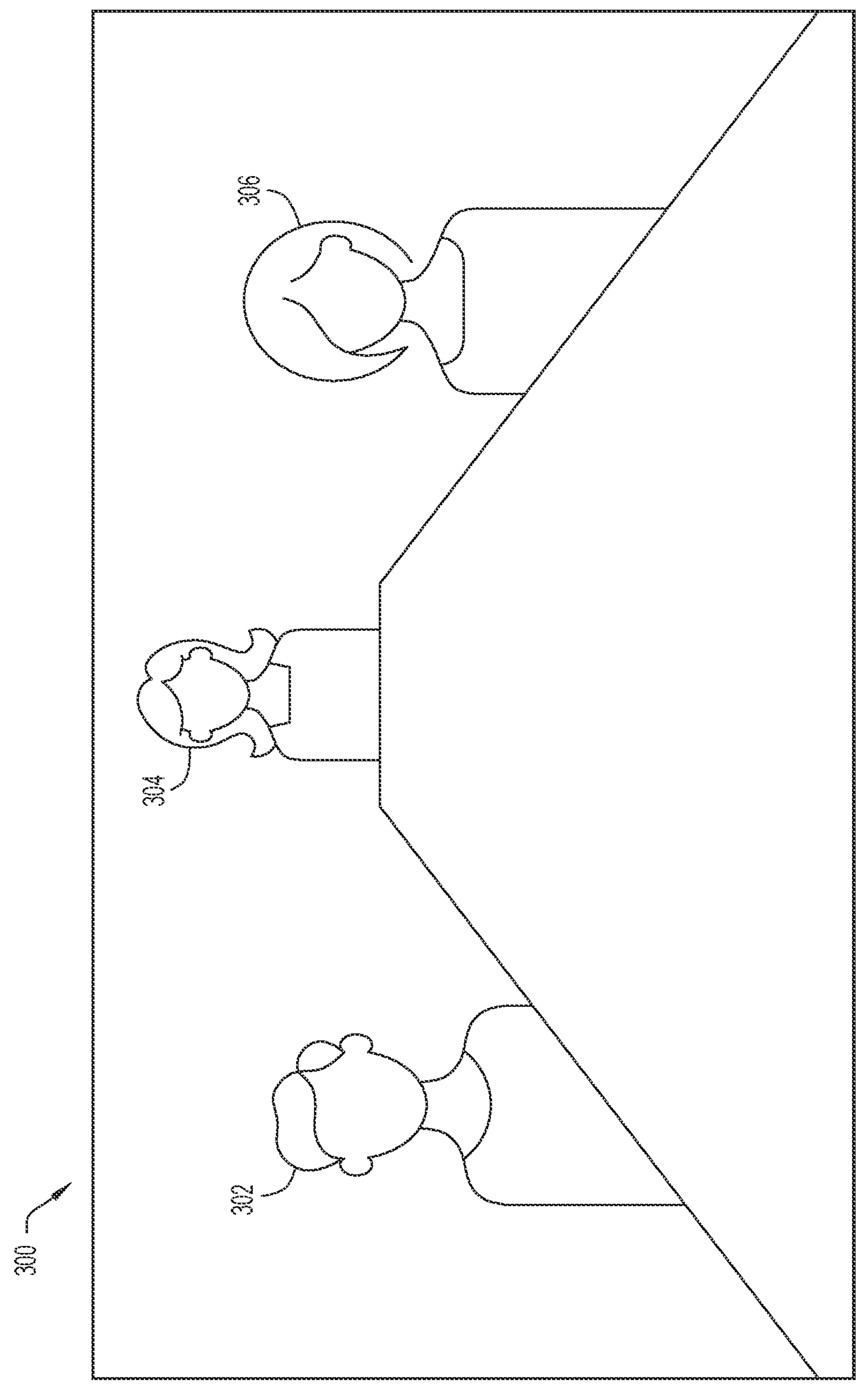
FIG. 3 shows a video layout of the meeting room captured in video by a video camera of the endpoint, according to an example embodiment.

FIG. 3 shows an example video layout 300 (i.e., an image of the video layout) of a meeting room captured in video by video camera 112. Video layout 300 may be displayed on display 114 while endpoint 102 operates in a self-view mode. Video layout 300 shows individuals 302, 304, and 306 seated around a table in the meeting room. The individuals are spaced-apart from one another such that a large portion of the video layout is wasted on background scenes (i.e., non-individuals). Moreover, the individuals can appear quite small, which can make it difficult to recognize their faces.

New video processing techniques can improve the video layout, as shown in FIG. 4. FIG. 4 shows an improved video layout or mosaic layout 400 of the meeting room. The new video processing techniques extract separate video streams for each of individuals 302, 304, and 306 and present the video streams side-by-side in mosaic layout 400. Mosaic layout 400 provides closer views and equal head sizes of the individuals. In a hybrid workspace, some individuals work from home while other groups work together in the meeting room. The mosaic layout is remote-work friendly because all individuals participating in a video conference appear more-or-less the same, independent of their locations.

Modern business architecture has evolved into frequent use of glass walls for offices and meeting rooms. Glass walls/windows present a challenge when using head detection to establish a video layout because head detection detects all visible heads, including heads of in-room participants who are legitimate participants of a video conference and heads of individuals behind the glass wall, who are not participants of the video conference. Head detection alone cannot separate the in-room participants from the individuals behind the glass wall.

FIG. 5A shows an example video layout 500 of the meeting room from a vantage point that captures an individual 502 standing behind a glass wall 504 positioned between the individual and the video camera. The video layout includes individual 502.

FIG. 5B shows an example mosaic layout 550 that presents all individuals, including (in-room) individuals 302 and 304 and also individual 502 standing behind the glass wall. Head detection alone cannot filter-out individual 502 standing behind the glass wall. Mosaic layout 550 is not a desired video layout for transmission to a far-end endpoint during a video conference. The desired video layout only includes the in-room participants.

Video processing/analysis techniques that may be employed in the embodiments are described briefly. As a starting point, video camera 112 captures video of a room using a wide-angle view (i.e., a wide FOV), and performs video analysis of wide-angle captured video. The video processing/analysis includes face detection (i.e., detecting faces), face tracking (i.e., tracking faces), movement detection (i.e., detecting movement), and so on. Face detection is configured to detect a face and estimate a face position of the face (as detected) relative to video camera 112. The face position includes a face distance (FD) and a face angle (FA) of the face relative to video camera 112. The face angle is an angle between a line connecting the face to the video camera 112 and a reference line, such as a perpendicular line originating at and extending away from the video camera into the FOV. To estimate the face distance, the face detection estimates a face size of the face (e.g., an area of the face) and determines the face distance based on the face size; the larger the face size, the smaller the face distance, and vice versa. Any known or hereafter developed technique to determine face size and translate the same to face distance may be used.

Figure 6:
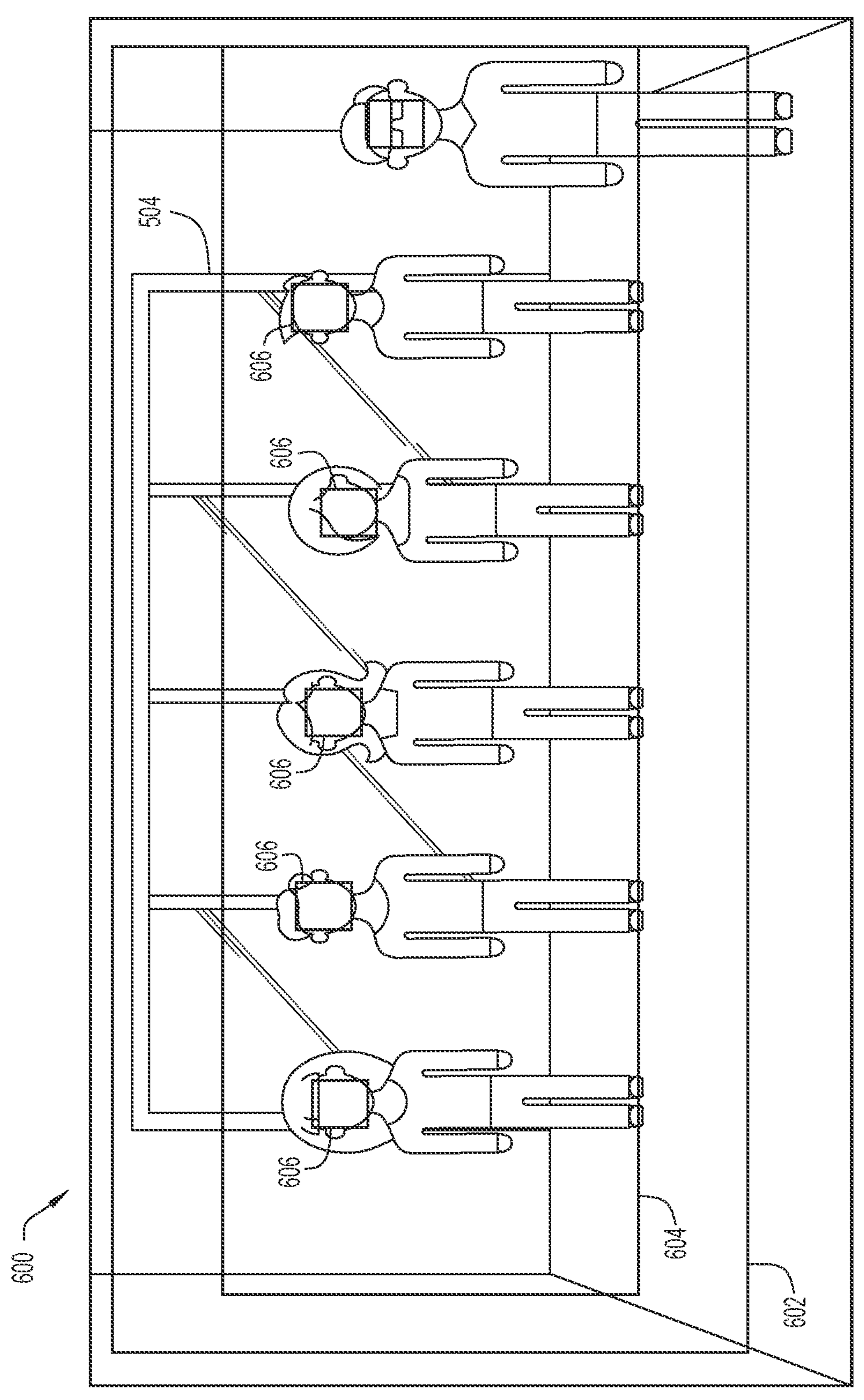
FIG. 6 shows a video layout for a wide-angle view of the meeting room including multiple individuals, according to an example embodiment.

The video processing/analysis partitions the wide-angle view into parts of interest as shown in FIG. 6, and selectively includes only some of the parts in a video layout for transmission to far-end endpoints in a video conference. FIG. 6 shows an example video layout 600 for a wide-angle view of the meeting room, which includes multiple individuals. Video processing/analysis identifies separable portions in video layout 600 for possible inclusion in one or more mosaic layouts, as follows: optional outer rectangular crop 602; optional inner rectangular crop 604; and individual detected faces 606 (small rectangles) of individuals positioned in front of glass wall 504 relative to video camera 112. In a scenario in which individuals are positioned behind glass wall 504 relative to video camera 112, the video processing/analysis will also detect faces of those individuals.

Figure 7:
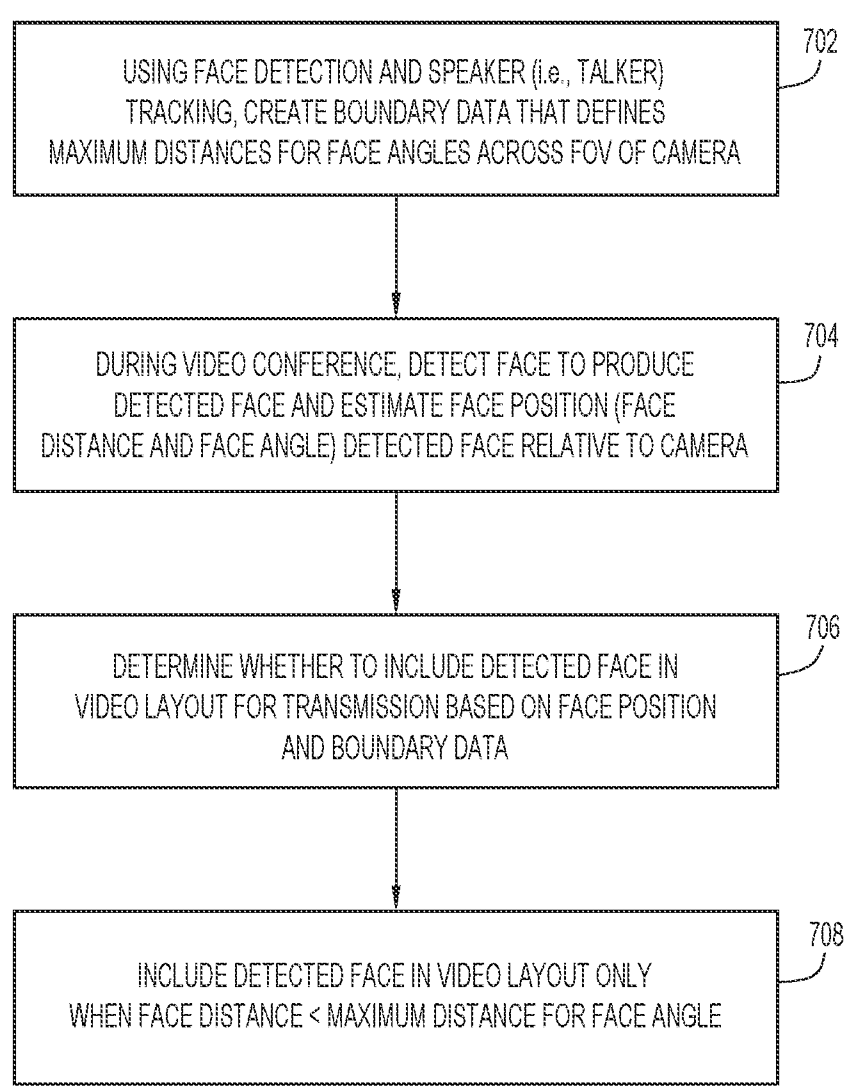
FIG. 7 is a flowchart of a method of using boundary data to filter detected faces for inclusion in a video layout for transmission, according to an example embodiment.

FIG. 7 is a high-level flowchart of an example method 700 of using boundary data to filter faces for inclusion in a video layout for transmission, according to an embodiment. Method 700 is performed by endpoint 102. Video camera 112 captures video of a room (e.g., a meeting room) in a FOV of the video camera. The room may include a glass window or wall.

At 702, endpoint 102 creates boundary data for a boundary that defines maximum distances for face angles across the FOV. The maximum distances do not extend past glass (or similar visually transparent, but generally acoustically blocking) boundaries, as described above. Endpoint 102 stores the boundary data in memory for later use. Endpoint 102 may create the boundary data in a training mode prior to a video conference session, or during the video conference session. The boundary data may define maximum distances that stop short of a glass boundary. Methods used to create the boundary data employ both face detection and talker detection as will be described below in connection with FIGS. 8A-11B.

At 704, during a video conference session, endpoint 102 detects a face to produce a detected face and estimates a face position of the detected face relative to video camera 112. The face position includes a face distance and a face angle. To estimate face distance, endpoint 102 computes a face size of the detected face and estimates the face distance based on the face size, for example.

At 706, endpoint 102 determines whether to include the detected face in a video layout for transmission based on the face position and the boundary data. For example, endpoint 102 compares the face distance to a maximum distance for a face angle stored in the boundary data (from 702) that matches the face angle (from 704) within a predetermined angular range (e.g., within +/−5°).

At 708, when the face distance is less than the maximum distance, endpoint 102 includes the detected face in the video layout for transmission. In contrast, when face distance is not less than the maximum distance, endpoint 102 does not include the detected face in the video layout for transmission; i.e., endpoint 102 rejects the detected face. Thus, endpoint 102 only includes the detected face in the video layout when the face distance is less than the maximum distance for the face angle stored in the boundary data and that matches the face angle.

At 702 described above, endpoint 102 may create the boundary data in different ways, depending on an endpoint operating mode. The boundary data may be generated in an automatic (i.e., "auto") mode or a training mode.

Figure 8A:
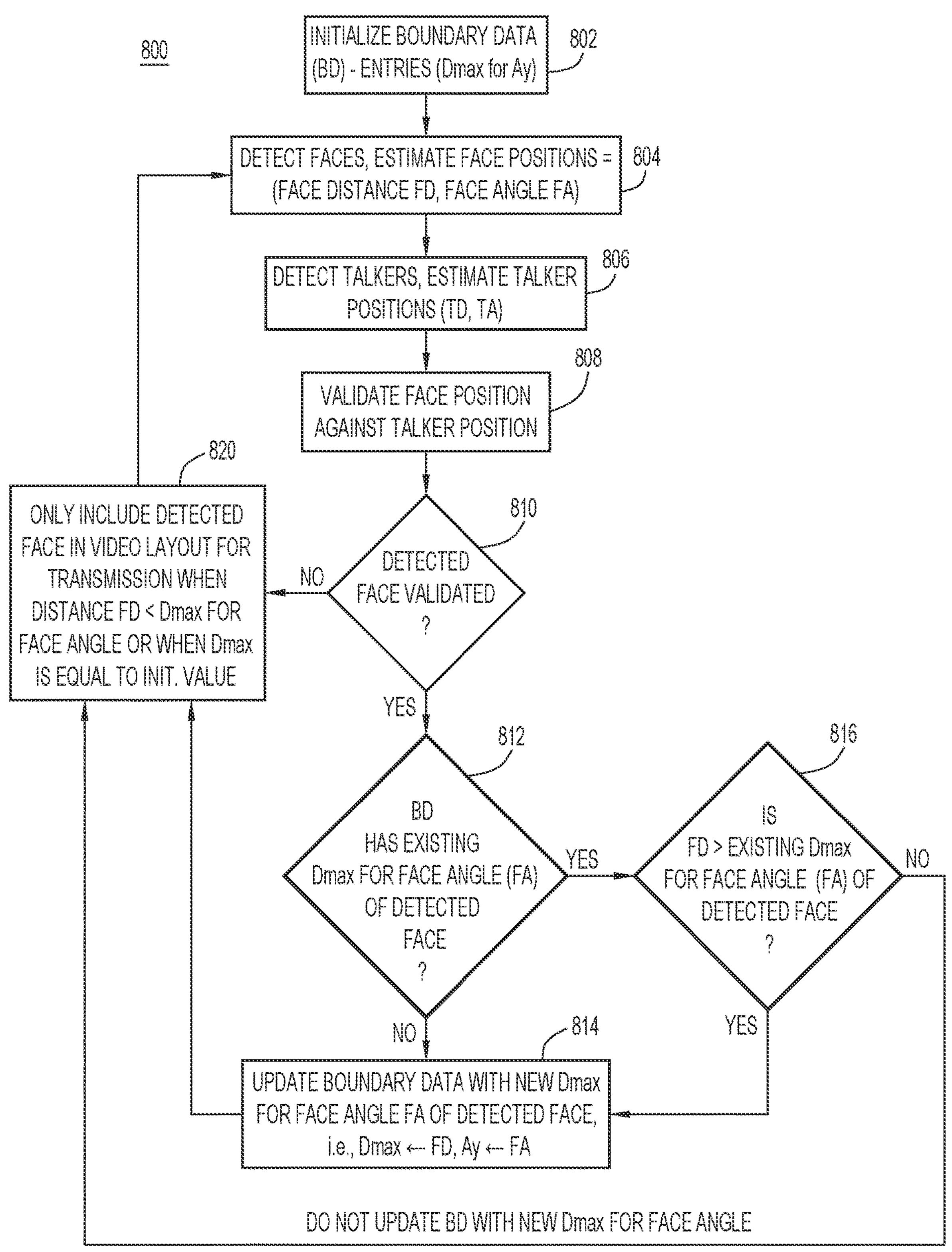
FIG. 8A is a flowchart of a method of creating boundary data in an automatic (or "auto") mode, according to an example embodiment.

The auto mode is now described with reference to FIG. 8A, which is a flowchart of an example method 800 of creating boundary data in the auto mode.

At 802, boundary data in memory is initialized. The boundary data may be initialized to predetermined non-zero values, or alternatively to zero values, for example.

At 804, endpoint 102 repeatedly performs face detection on video captured in the FOV of video camera 112 to detect faces and estimate face positions of the detected faces relative to the video camera. Each face position includes a face distance FD and a face angle FA.

Concurrent with 804, at 806, endpoint 102 repeatedly performs speaker tracking on audio detected by microphone array 118 to detect talkers and estimate talker positions of the detected talkers relative to the microphone array. Each talker position includes a talker distance TD and talker angle TA.

For each detected face, endpoint 102 performs next operations 808-820.

At 808, endpoint 102 validates (or attempts to validate) the face position based on available talker positions. To do this, endpoint 102 compares/correlates the face position against the talker positions that are available. For example, endpoint compares face distance FD and face angle FA to available talker distances TDs and talker angles TAs. When endpoint 102 determines that the face position coincides with/matches one of the talker position consistently over a predetermined period of time based on the comparisons, the face position is validated, otherwise the face position is not validated. Flow proceeds from 808 to 810, where endpoint 102 determines whether the detected face is validated. When the detected face is validated, flow proceeds from 810 to 812. When the face is not validated, flow proceeds from 810 to 820 (described below).

At 812, endpoint 102 determines whether the boundary data includes an existing maximum distance Dmax for the face angle FA, e.g., the endpoint searches face angles Ay already stored in the boundary data. When there is no existing Dmax, flow proceeds to 814 (described below). When there is an existing Dmax, flow proceeds to 816. At 816, endpoint 102 determines whether face distance FD>existing Dmax for face angle FA (i.e., an angle Ay=FA) stored in the boundary data. When FD>existing Dmax, flow proceeds to 814. When FD is not greater than existing Dmax, flow proceeds to 820, without updating the boundary data with face distance FD.

At 814, endpoint 102 stores (in the boundary data) face distance FD and face angle FA as a new maximum distance Dmax for an angle Ay that matches face angle FA. In other words, new Dmax←FD, new Ay←FA. This represents an update to the boundary data. Flow proceeds to 820. Thus, method 800 only updates the boundary data with a new Dmax for face angle FA/Ay when (i) there is no existing Dmax for face angle FA in the boundary data, or (ii) face distance FD>existing Dmax for the same face angle.

Operations 802-816 may be performed while endpoint 102 participates in a video conference. In that case, at 820 (performed in connection with participating in the video conference), endpoint 102 only includes the detected face in a video layout for transmission when FD<Dmax for angle Ay that matches face angle FA, or when Dmax is equal to an initial non-zero value (e.g., from operation 802) (which avoids excluding an individual from being incorporated into a video layout for transmission after a restart of the endpoint, simply because the individual is not speaking). From 820, flow returns to 804 to repeat the process for a next detected face.

Repeating method 800 over time creates boundary data that defines a respective maximum distance Dmax for each of many angles within the field of view of video camera 112. For example, the boundary data may include many tuples of the form [Dmax, Ay] that define face detection boundary points in the field of view of video camera 112. Also, it is understood that the order of operations of method 800 may be permuted in different examples.

Figure 8B:
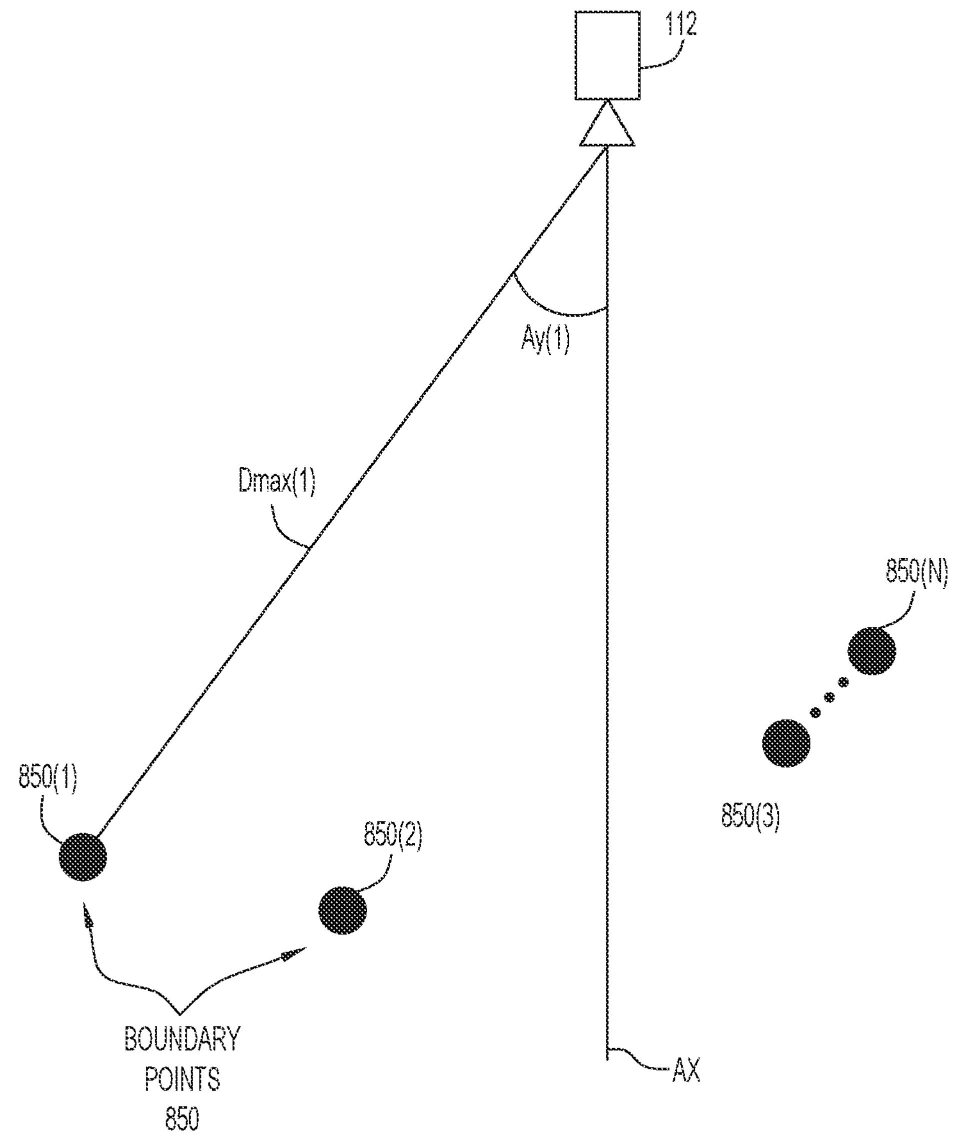
FIG. 8B is an illustration of boundary points superimposed on a camera field-of-view produced by the method of FIG. 8A, according to an example embodiment.

FIG. 8B is an illustration of example boundary points 850(1)-850(N) (collectively referred to as boundary points 850) of boundary data produced by method 800. Boundary points 850 are arranged in the FOV of video camera 112. Each boundary point 850(*i*) is positioned a maximum distance Dmax(i) away from video camera 112. A line connecting boundary point 850(*i*) to video camera 112 subtends a (face) angle Ay(i) from a perpendicular axis-line AX that extends away from the video camera into the FOV.

The training mode is now described. In the training mode, endpoint 102 establishes "trained" boundary data for subsequent use. After training, endpoint 102 operates normally during a video conference to filter/reject certain detected faces using the boundary data. Additionally, during the video conference, endpoint 102 may employ the auto mode to update Dmax values in the boundary data over time.

While in the training mode, endpoint 102 implements the operations of method 800, except for operation 820. In a training example, an individual moves around a room while talking. At the same time, endpoint 102 performs face detection and talker tracking on the individual. As endpoint 102 correlates detected face positions with detected talker positions, the endpoint updates the boundary data. Concurrently, endpoint 102 displays a user interface (UI) on display 114 that presents entries of the boundary data in graphical form, such as boundary points, which are created while training, as shown in FIG. 9.

Figure 9:
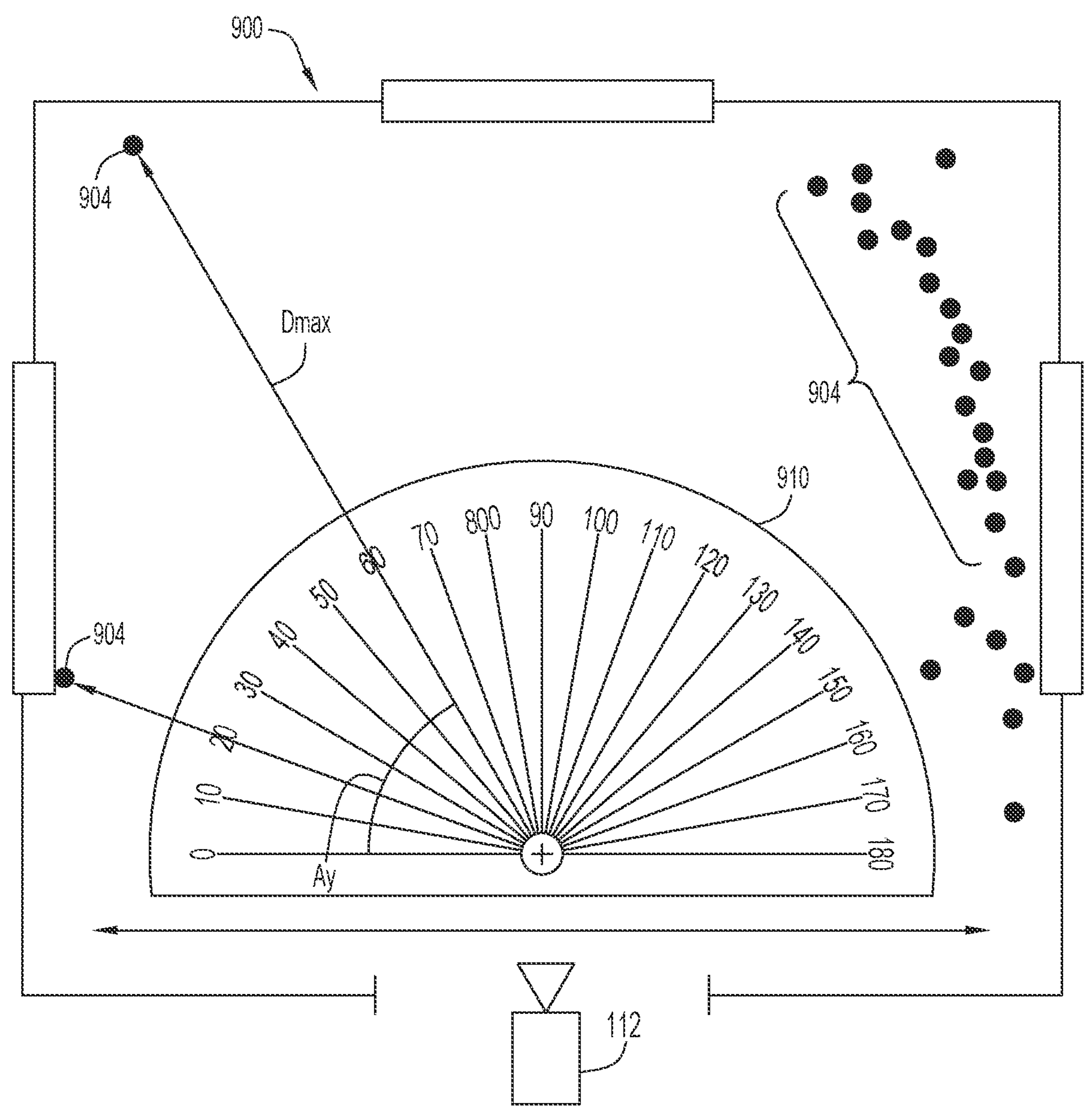
FIG. 9 is an illustration of a user interface (UI) generated by the endpoint during a training mode, while a talking individual moves around the meeting room, according to an embodiment.

FIG. 9 is an illustration of an example UI 900 generated for display (and which may be displayed) by endpoint 102 during the training mode, while the talking individual moves around the room. UI 900 presents a simplified rectangular top-down view of a FOV of video camera 112. UI 900 presents boundary points 904 (also referred to as "training" boundary points) of boundary data placed in the FOV along a perimeter of the room. Each boundary point graphically represents a stored maximum distance Dmax for a face angle Ay relative to video camera 112. UI 900 may also present a protractor 910 to indicate the angles. The series of boundary points 904 collectively represent a face detection boundary. In the example of FIG. 9, each face angle Ay is measured from a horizontal axis-line extending through video camera 112.

The training mode may be setup as a "wizard" that employs interactive UIs to guide a user through the training process and to present options that solicit various information (e.g., boundary data) from the user. The wizard may instruct the user to perform various actions. The user can enter the information manually via the UIs. For example, the wizard may display a UI requesting the user to enter a number of walls surrounding the room. The use enters the number of walls via the UI. The wizard may present on display 114 a self-view of the room captured by video camera 112. The wizard may display a UI that asks the user to stand at an edge of the field-of-the view as far away from the video camera as possible, and to then speak. In response to the directions, the user may move to different room checkpoints, e.g., to a 1$^{st}$ corner of the room, a 2$^{nd}$ corner of the room, and so on. For example, the user may talk while moving around the room adjacent to each wall. At each room checkpoint, endpoint 102 validates a detected face, creates a corresponding boundary point, and stores the same in the boundary data.

Figure 10:
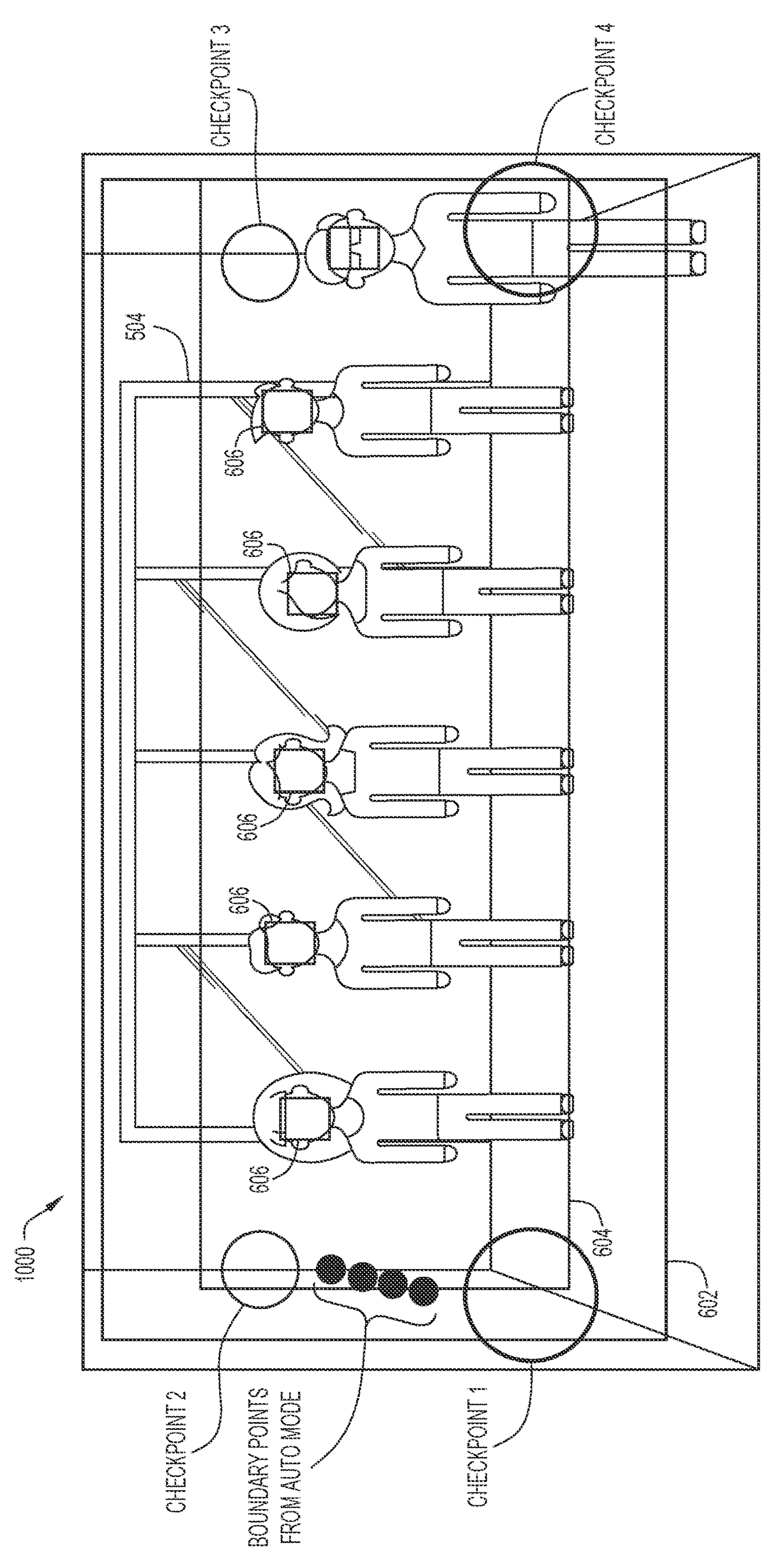
FIG. 10 is an illustration of another UI generated during the training mode, according to an embodiment.

FIG. 10 is an illustration of an example UI 1000 generated for display during and/or after running in the training mode. UI 1000 presents a view of the room to include individuals present in the room and also to include checkpoints 1-4, which have been created during training. UI 1000 also presents boundary points that were created by the auto mode.

In another embodiment, the training mode may display a UI on a touch screen of endpoint 102 or a mobile device connected to the endpoint over a wired or wireless connection. The UI presents the boundary points in real-time as they are created. The UI may also present an option prompt to enter new boundary points (e.g., new maximum distances Dmax and corresponding new angles Ay). The user may then enter the new boundary points manually via the UI. Endpoint 102 receives the entered boundary points (e.g., a new maximum distance for a new face angle) and stores the same as new boundary data. Alternatively, the user may touch a position on the touch screen corresponding to a desired boundary point in the room. Responsive to the touch/press, endpoint 102 creates a boundary point as directed and stores the same as boundary data.

Figure 11A:
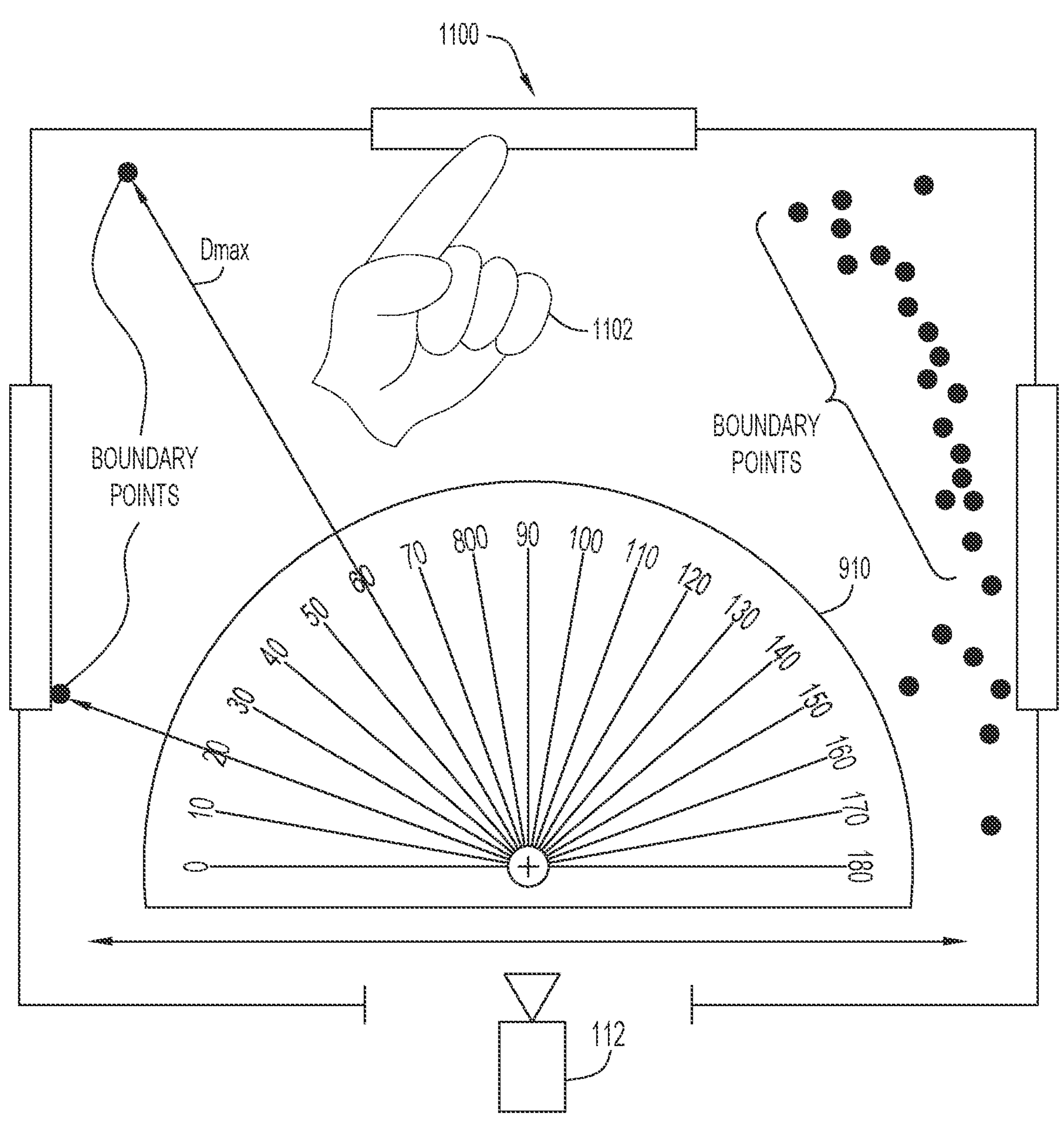
FIG. 11A is an illustration of another UI generated during the training mode, and which shows a user finger pressing a touch screen to create boundary points at desired positions in the meeting room, according to an embodiment.

FIG. 11A is an illustration of an example UI 1100 generated for display during the training mode. A finger of a user hand 1102 is shown pressing the touch screen to create boundary points at a desired position in the room.

Figure 11B:
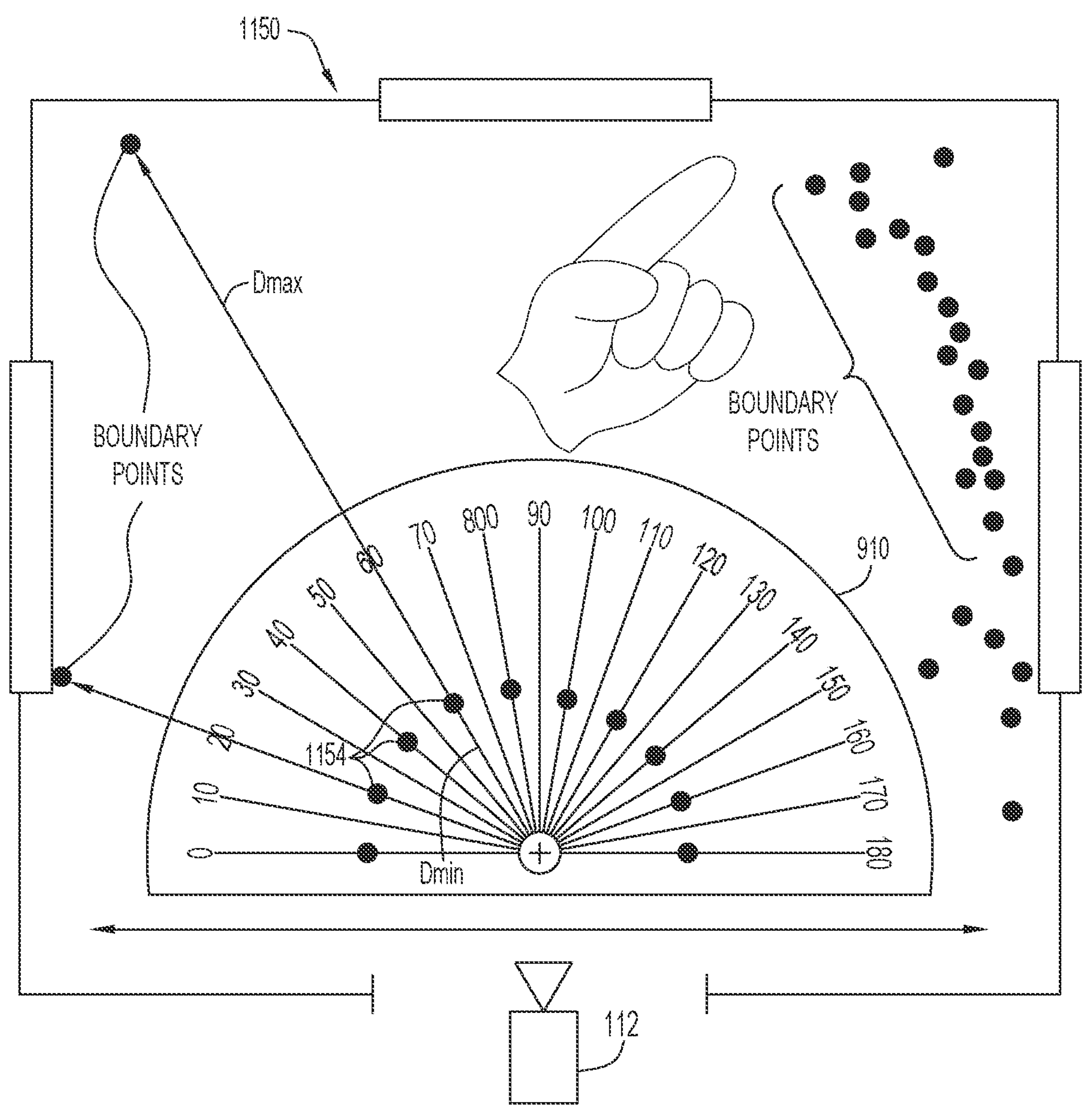
FIG. 11B is an illustration of a UI that accepts entry of minimum distances for face angles in addition to entry of maximum distances, according to an example embodiment.

FIG. 11B is an illustration of an example UI 1150 similar to UI 1100, except that UI accepts entry of minimum distances for face angles in addition to entry of maximum distances. Minimum distances per angle are stored as minimum distance boundary points in the boundary data, and presented on UI 1150 as minimum distance boundary points 1154. During a video conference, endpoint 102 only includes detected faces having face distances that fall between a maximum distance and a minimum distance for a given face angle.

Figure 12:
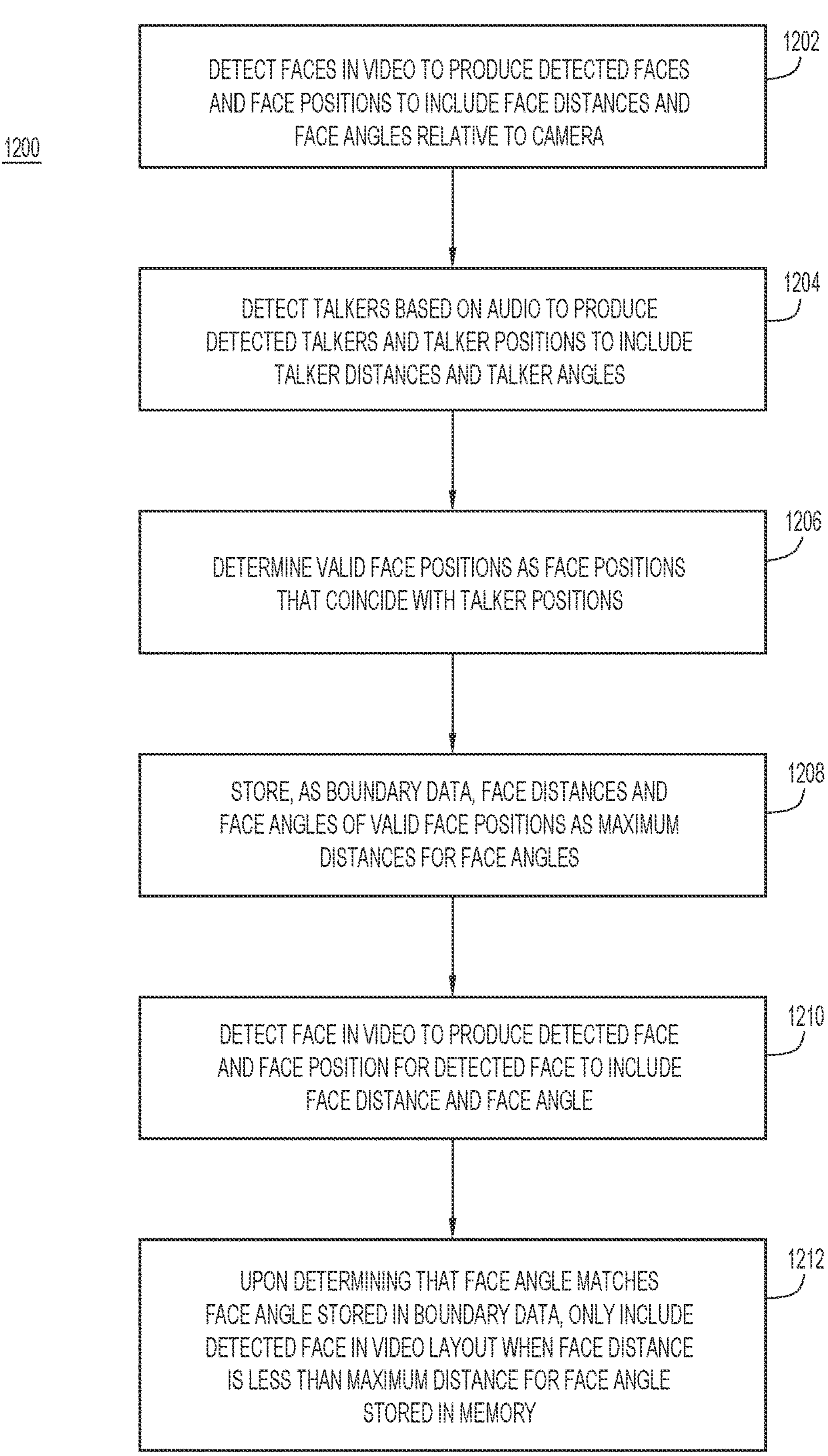
FIG. 12 is a flowchart of an example method of creating boundary data for face detection and determining whether to reject or include faces during a video conference using the boundary data, according to an example embodiment.

FIG. 12 is a flowchart of an example method 1200 of creating boundary data for face detections and determining whether to reject or include faces as detected during a video conference using the boundary data. Method 1200 may be performed by endpoint 102 (e.g., an endpoint device), which includes microphone array 118 to detect audio, video camera 112 to capture video in a field of view of the video camera, and controller 208 to process the video and the audio, and to transmit the same to a network during a video conference.

At 1202, endpoint 102 detects faces in the video to produce detected faces and face positions for the detected faces as face distances and face angles relative to the video camera. Detecting faces includes estimating the face positions.

Concurrently with 1202, at 1204, endpoint 102 detects talkers based on the audio to produce detected talkers and talker positions for the detected talkers as talker distances and talker angles relative to a microphone array. Detecting talkers includes estimating the talker positions.

At 1206, endpoint 102 determines valid face positions as ones of the face positions that coincide with or match ones of the talker positions over a predetermined period of time and within a predetermined positional tolerance.

At 1208, endpoint 102 stores, as boundary data, face distances and face angles for the valid face positions as maximum distances (Dmax) for the face angles (Ay). Thus, the boundary data includes boundary points represented by tuples of the form [Dmax(i), Ay(i)].

At 1210, e.g., during a video conference, endpoint 102 detects a face to produce a face position including a face distance (FD) and a face angle (FA) relative to the video camera.

Upon determining that the face angle (FA) matches a face angle (Ay) that is stored in the boundary data, at 1212, endpoint 102 includes or does not include the detected face in a video layout for transmission based on a comparison between the face position and the boundary data (e.g., the boundary points). Specifically, endpoint 102 does not include the detected face in the video layout when the face distance is not less than the maximum distances (Dmax) for the face angle stored in the boundary data. On the other hand, endpoint 102 includes the detected face in the video layout when the face is less than the maximum distance. In other words, endpoint 102 only includes the detected face in the video layout when the face distance is less than the maximum distance.

In another embodiment, endpoint 102 may also store, as the boundary data, minimum distances for the face angles. In that case, upon determining that the face angle matches the face angle that is stored in the boundary data, endpoint 102 only includes the detected face in the video layout when the face distance is between the maximum distance and a minimum distance for the face angle that is stored in the boundary data.

In method 1200, endpoint 102 may operate in an a priori training mode to create the boundary data. The training mode may include operations 1202-1208. After completion of the training mode, endpoint 102 may operate in a normal mode and engage in a video conference with far-end endpoints. During the video conference, endpoint 102 performs operations 1210 and 1212. Additionally, endpoint 102 may update the boundary data during the video conference.

In summary, in an endpoint, talker/speaker tracking uses a microphone array to estimate direction and distance to a talker/speaker. Also, head detection detects faces (or heads) in a video stream captured by a camera. A distance to each detected face is estimated based on the size of the detected face. When talker tracking and face detection produce approximately the same talker and face positions over a time period, the face detection is considered to be a valid face detection within a meeting room. The valid detections are used to find a maximum distance for each direction in a set of directions, including pan and tilt values, to produce a matrix of maximum distances. The matrix of maximum distances can be used to decide if a detected head is within the meeting room or outside a glass window. This data is then stored so that it can be used after a reboot. The more valid detections that are logged by the endpoint, the better the matrix of maximum distances for the set of directions will be, and the better the video framing will work with respect to avoid head detections outside the meeting room.

Figure 13:
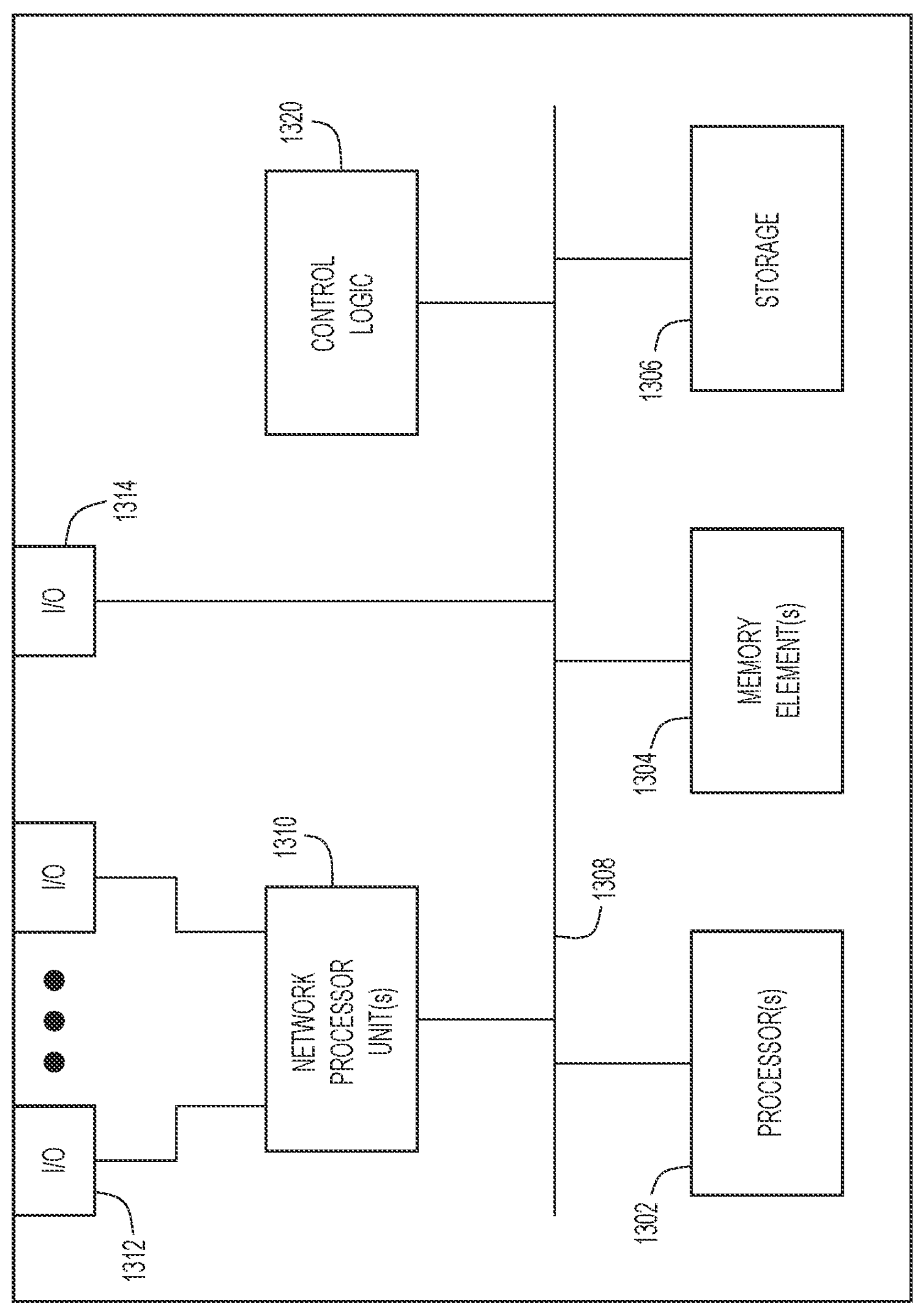
FIG. 13 illustrates a hardware block diagram of a computing device that may perform functions associated with operations discussed herein in connection with the techniques depicted in FIGS. 1-12, according to an example embodiment.

Referring to FIG. 13, FIG. 13 illustrates a hardware block diagram of a computing device 1300 that may perform functions associated with operations discussed herein in connection with the techniques depicted in FIGS. 1-12. In various embodiments, a computing device or apparatus, such as computing device 1300 or any combination of computing devices 1300, may be configured as any entity/entities as discussed for the techniques depicted in connection with FIGS. 1-12 in order to perform operations of the various techniques discussed herein. For example, computing device 1300, or various components of the computing device, may represent endpoint 102 and controller 208.

In at least one embodiment, the computing device 1300 may be any apparatus that may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 (wired and/or wireless) to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, any other I/O port(s), and/or antenna(s)/antenna array(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method performed by an endpoint device that includes a microphone array to detect audio and a camera to capture video, including: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

In some aspects, the techniques described herein relate to a method, wherein the face position includes a face distance and a face angle relative to the camera, and the method further includes: upon determining that the face angle matches a face angle that is stored in the boundary data, only including the detected face in the video layout when the face distance is less than a maximum distance for the face angle that is stored in the boundary data.

In some aspects, the techniques described herein relate to a method, further including: storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

In some aspects, the techniques described herein relate to a method, wherein: detecting the faces includes estimating face positions for the detected faces as face distances and face angles relative to the camera; detecting the talkers includes estimating talker positions of the detected talkers relative to the microphone array; and determining the valid face positions includes determining, as the valid face positions, ones of the face positions that coincide with ones of the talker positions.

In some aspects, the techniques described herein relate to a method, wherein: detecting the faces further includes computing a face size for each of the faces and computing a distance for each of the faces based on the face size for each of the faces.

In some aspects, the techniques described herein relate to a method, further including, by the endpoint device: operating in a training mode to create the boundary data by detecting the faces, detecting the talkers, determining the valid face positions, and storing; and after the training mode, engaging in a video conference, which includes detecting the face and including or not including the detected face in the video layout for transmission.

In some aspects, the techniques described herein relate to a method, further including, by the endpoint device: updating the boundary data during the video conference using the detected face.

In some aspects, the techniques described herein relate to a method, further including: displaying a user interface that depicts a field of view of the camera, and boundary points placed in the field of view relative to the camera to represent the maximum distances for the face angles stored in the boundary data.

In some aspects, the techniques described herein relate to a method, further including: displaying a user interface through which new boundary data is entered manually; receiving entry of the new boundary data via the user interface; and responsive to the entry, storing a new maximum distance and a new face angle for the new boundary data.

In some aspects, the techniques described herein relate to a method, wherein: the user interface presents a prompt for entry of the new maximum distance and the new face angle.

In some aspects, the techniques described herein relate to a method, further including: displaying a user interface that presents a self-view of a room as captured by the camera; performing detecting faces, detecting the talkers, and determining the valid face positions for a talker moving through the room adjacent to each wall to create the boundary data; and presenting the boundary data via the user interface.

In some aspects, the techniques described herein relate to an apparatus including: a microphone array to detect audio; a camera to capture video; and a controller coupled to the microphone array and the camera and configured to perform: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

In some aspects, the techniques described herein relate to an apparatus, wherein the face position includes a face distance and a face angle relative to the camera, and the controller is further configured to perform: upon determining that the face angle matches a face angle that is stored in the boundary data, only including the detected face in the video layout when the face distance is less than a maximum distance for the face angle that is stored in the boundary data.

In some aspects, the techniques described herein relate to an apparatus, wherein the controller is further configured to perform: storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

In some aspects, the techniques described herein relate to an apparatus, wherein: the controller is configured to perform detecting the faces by estimating face positions for the detected faces as face distances and face angles relative to the camera; the controller is configured to perform detecting the talkers by estimating talker positions of the detected talkers relative to the microphone array; and the controller is configured to perform determining the valid face positions by determining, as the valid face positions, ones of the face positions that coincide with ones of the talker positions.

In some aspects, the techniques described herein relate to an apparatus, wherein: the controller is configured to perform detecting the faces by includes computing a face size for each of the faces and computing a distance for each of the faces based on the face size for each of the faces.

In some aspects, the techniques described herein relate to an apparatus, wherein the controller is further configured to perform: operating in a training mode to create the boundary data by detecting the faces, detecting the talkers, determining the valid face positions, and storing; and after the training mode, engaging in a video conference, which includes detecting the face and including or not including the detected face in the video layout for transmission.

In some aspects, the techniques described herein relate to a non-transitory computer readable medium encoded with instructions that, when executed by a controller of an endpoint device that includes a microphone array to detect audio and a camera to capture video, cause the controller to perform: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

In some aspects, the techniques described herein relate to a non-transitory computer readable medium, wherein the face position includes a face distance and a face angle relative to the camera, and the non-transitory computer readable medium further includes instructions to cause the controller to perform: upon determining that the face angle matches a face angle that is stored in the boundary data, only including the detected face in the video layout when the face distance is less than a maximum distance for the face angle that is stored in the boundary data.

In some aspects, the techniques described herein relate to a non-transitory computer readable medium, further including instructions to cause the controller to perform: storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

In some aspects, the techniques described herein relate to a method performed by an endpoint device that includes a microphone array to detect audio and a camera to capture video, including: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

In some aspects, the techniques described herein relate to a method, wherein the face position includes a face distance and a face angle relative to the camera, and the method further includes: upon determining that the face angle matches a face angle that is stored in the boundary data, only including the detected face in the video layout when the face distance is less than a maximum distance for the face angle that is stored in the boundary data.

In some aspects, the techniques described herein relate to a method, further including: storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

In some aspects, the techniques described herein relate to a method, wherein: detecting the faces includes estimating face positions for the detected faces as face distances and face angles relative to the camera; detecting the talkers includes estimating talker positions of the detected talkers relative to the microphone array; and determining the valid face positions includes determining, as the valid face positions, ones of the face positions that coincide with ones of the talker positions.

In some aspects, the techniques described herein relate to a method, wherein: detecting the faces further includes computing a face size for each of the faces and computing a distance for each of the faces based on the face size for each of the faces.

In some aspects, the techniques described herein relate to a method, further including, by the endpoint device: operating in a training mode to create the boundary data by detecting the faces, detecting the talkers, determining the valid face positions, and storing; and after the training mode, engaging in a video conference, which includes detecting the face and including or not including the detected face in the video layout for transmission.

In some aspects, the techniques described herein relate to a method, further including, by the endpoint device: updating the boundary data during the video conference using the detected face.

In some aspects, the techniques described herein relate to a method, further including: displaying a user interface that depicts a field of view of the camera, and boundary points placed in the field of view relative to the camera to represent the maximum distances for the face angles stored in the boundary data.

In some aspects, the techniques described herein relate to a method, further including: displaying a user interface through which new boundary data is entered manually; receiving entry of the new boundary data via the user interface; and responsive to the entry, storing a new maximum distance and a new face angle for the new boundary data.

In some aspects, the techniques described herein relate to a method, wherein: the user interface presents a prompt for entry of the new maximum distance and the new face angle.

In some aspects, the techniques described herein relate to a method, further including: displaying a user interface that presents a self-view of a room as captured by the camera; performing detecting faces, detecting the talkers, and determining the valid face positions for a talker moving through the room adjacent to each wall to create the boundary data; and presenting the boundary data via the user interface.

In some aspects, the techniques described herein relate to an apparatus including: a microphone array to detect audio; a camera to capture video; and a controller coupled to the microphone array and the camera and configured to perform: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

In some aspects, the techniques described herein relate to an apparatus, wherein the face position includes a face distance and a face angle relative to the camera, and the controller is further configured to perform: upon determining that the face angle matches a face angle that is stored in the boundary data, only including the detected face in the video layout when the face distance is less than a maximum distance for the face angle that is stored in the boundary data.

In some aspects, the techniques described herein relate to an apparatus, wherein the controller is further configured to perform: storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

In some aspects, the techniques described herein relate to an apparatus, wherein: the controller is configured to perform detecting the faces by estimating face positions for the detected faces as face distances and face angles relative to the camera; the controller is configured to perform detecting the talkers by estimating talker positions of the detected talkers relative to the microphone array; and the controller is configured to perform determining the valid face positions by determining, as the valid face positions, ones of the face positions that coincide with ones of the talker positions.

In some aspects, the techniques described herein relate to an apparatus, wherein: the controller is configured to perform detecting the faces by includes computing a face size for each of the faces and computing a distance for each of the faces based on the face size for each of the faces.

In some aspects, the techniques described herein relate to an apparatus, wherein the controller is further configured to perform: operating in a training mode to create the boundary data by detecting the faces, detecting the talkers, determining the valid face positions, and storing; and after the training mode, engaging in a video conference, which includes detecting the face and including or not including the detected face in the video layout for transmission.

In some aspects, the techniques described herein relate to a non-transitory computer readable medium encoded with instructions that, when executed by a controller of an endpoint device that includes a microphone array to detect audio and a camera to capture video, cause the controller to perform: detecting faces in the video to produce detected faces; detecting talkers based on the audio to produce detected talkers; determining valid face positions based on the detected faces and the detected talkers; storing, as boundary data, face distances and face angles for the valid face positions as maximum distances for the face angles; detecting a face in the video to produce a detected face and a face position for the detected face; and including or not including the detected face in a video layout for transmission based on the face position and the boundary data.

In some aspects, the techniques described herein relate to a non-transitory computer readable medium, wherein the face position includes a face distance and a face angle relative to the camera, and the non-transitory computer readable medium further includes instructions to cause the controller to perform: upon determining that the face angle matches a face angle that is stored in the boundary data, only including the detected face in the video layout when the face distance is less than a maximum distance for the face angle that is stored in the boundary data.

In some aspects, the techniques described herein relate to a non-transitory computer readable medium, further including instructions to cause the controller to perform: storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Various modifications and structural changes may be made therein without departing from the scope of the concepts described herein and within the scope and range of equivalents of the claims.

What is claimed is:

1. A method performed by an endpoint device that includes a microphone array to detect audio and a camera to capture video, comprising:

detecting faces in the video to produce detected faces;

detecting talkers based on the audio to produce detected talkers;

determining valid face positions based on the detected faces and the detected talkers;

storing, as boundary data, face distances and face angles for the valid face positions as maximum distances for the face angles;

detecting a face in the video to produce a detected face and a face position for the detected face;

including or not including the detected face in a video layout for transmission based on the face position and the boundary data; and displaying a first user interface that depicts a field of view of the camera, and boundary points placed in the field of view relative to the camera to represent the maximum distances for the face angles stored in the boundary data.

2. The method of claim 1, wherein the face position includes a face distance and a face angle relative to the camera, and the method further comprises:

upon determining that the face angle matches a face angle that is stored in the boundary data, only including the detected face in the video layout when the face distance is less than a maximum distance for the face angle that is stored in the boundary data.

3. The method of claim 2, further comprising:

storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

4. The method of claim 1, wherein:

detecting the faces includes estimating face positions for the detected faces as face distances and face angles relative to the camera;

detecting the talkers includes estimating talker positions of the detected talkers relative to the microphone array; and determining the valid face positions includes determining, as the valid face positions, ones of the face positions that coincide with ones of the talker positions.

5. The method of claim 4, wherein:

detecting the faces further includes computing a face size for each of the faces and computing a distance for each of the faces based on the face size for each of the faces.

6. The method of claim 1, further comprising, by the endpoint device:

operating in a training mode to create the boundary data by detecting the faces, detecting the talkers, determining the valid face positions, and storing; and after the training mode, engaging in a video conference, which includes detecting the face and including or not including the detected face in the video layout for transmission.

7. The method of claim 6, further comprising, by the endpoint device:

updating the boundary data during the video conference using the detected face.

8. The method of claim 1, further comprising:

establishing a video conference over a network.

9. The method of claim 1, further comprising:

displaying a second user interface through which new boundary data is entered manually;

receiving entry of the new boundary data via the second user interface; and responsive to the entry, storing a new maximum distance and a new face angle for the new boundary data.

10. The method of claim 9, wherein:

the second user interface presents a prompt for entry of the new maximum distance and the new face angle.

11. The method of claim 1, wherein:

displaying the first user interface includes presenting a self-view of a room as captured by the camera; and the method further comprises:

performing detecting faces, detecting the talkers, and determining the valid face positions for a talker moving through the room adjacent to each wall to create the boundary data; and presenting the boundary data via the first user interface.

12. An apparatus comprising:

a microphone array to detect audio;

a camera to capture video; and a controller coupled to the microphone array and the camera and configured to perform:

detecting faces in the video to produce detected faces;

detecting talkers based on the audio to produce detected talkers;

determining valid face positions based on the detected faces and the detected talkers;

storing, as boundary data, face distances and face angles for the valid face positions as maximum distances for the face angles;

detecting a face in the video to produce a detected face and a face position for the detected face;

including or not including the detected face in a video layout for transmission based on the face position and the boundary data;

generating for display a user interface through which new boundary data is entered manually;

receiving entry of the new boundary data via the user interface; and responsive to the entry, storing a new maximum distance and a new face angle for the new boundary data.

13. The apparatus of claim 12, wherein the face position includes a face distance and a face angle relative to the camera, and the controller is further configured to perform:

upon determining that the face angle matches a face angle that is stored in the boundary data, only including the detected face in the video layout when the face distance is less than a maximum distance for the face angle that is stored in the boundary data.

14. The apparatus of claim 13, wherein the controller is further configured to perform:

storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

15. The apparatus of claim 12, wherein:

the controller is configured to perform detecting the faces by estimating face positions for the detected faces as face distances and face angles relative to the camera;

the controller is configured to perform detecting the talkers by estimating talker positions of the detected talkers relative to the microphone array; and the controller is configured to perform determining the valid face positions by determining, as the valid face positions, ones of the face positions that coincide with ones of the talker positions.

16. The apparatus of claim 15, wherein:

the controller is configured to perform detecting the faces by computing a face size for each of the faces and computing a distance for each of the faces based on the face size for each of the faces.

17. The apparatus of claim 12, wherein the controller is further configured to perform:

operating in a training mode to create the boundary data by detecting the faces, detecting the talkers, determining the valid face positions, and storing; and after the training mode, engaging in a video conference, which includes detecting the face and including or not including the detected face in the video layout for transmission.

18. A non-transitory computer readable medium encoded with instructions that, when executed by a controller of an endpoint device that includes a microphone array to detect audio and a camera to capture video, cause the controller to perform:

detecting faces in the video to produce detected faces;

detecting talkers based on the audio to produce detected talkers;

determining valid face positions based on the detected faces and the detected talkers;

storing, as boundary data, face distances and face angles for the valid face positions as maximum distances for the face angles;

detecting a face in the video to produce a detected face and a face position for the detected face;

including or not including the detected face in a video layout for transmission based on the face position and the boundary data; and displaying a user interface that depicts a field of view of the camera, and boundary points placed in the field of view relative to the camera to represent the maximum distances for the face angles stored in the boundary data.

19. The non-transitory computer readable medium of claim 18, wherein the face position includes a face distance and a face angle relative to the camera, and the non-transitory computer readable medium further comprises instructions to cause the controller to perform:

upon determining that the face angle matches a face angle that is stored in the boundary data, only including the detected face in the video layout when the face distance is less than a maximum distance for the face angle that is stored in the boundary data.

20. The non-transitory computer readable medium of claim 19, further comprising instructions to cause the controller to perform:

storing, as the boundary data, minimum distances for the face angles; and upon determining that the face angle matches the face angle that is stored in the boundary data, only including the detected face in the video layout when the face distance is between the maximum distance and a minimum distance for the face angle that is stored in the boundary data.

* * * * *